(12) United States Patent
Aizawa et al.

(10) Patent No.: US 6,715,683 B2
(45) Date of Patent: Apr. 6, 2004

(54) OPTICAL DATA CODE READER

(75) Inventors: Hidekuni Aizawa, Kanagawa (JP); Keiji Komiya, Tochigi (JP)

(73) Assignees: Sony Corporation, Tokyo (JP); Sano Fuji Koki Co., Ltd., Sano (JP)

( * ) Notice: Subject to any disclaimer, the term of this patent is extended or adjusted under 35 U.S.C. 154(b) by 0 days.

(21) Appl. No.: 10/327,940

(22) Filed: Dec. 26, 2002

(65) Prior Publication Data

US 2003/0127520 A1 Jul. 10, 2003

(30) Foreign Application Priority Data

Dec. 27, 2001 (JP) ........................................ 2001-395551

(51) Int. Cl.[7] ................................................. G06K 7/10
(52) U.S. Cl. .................... 235/462.25; 235/454; 235/455
(58) Field of Search ...................... 235/462.01–462.48, 235/472.01, 472.02, 472.03, 454, 455, 469, 494

(56) References Cited

U.S. PATENT DOCUMENTS 5,369,261 A * 11/1994 Shamir ........................ 235/469
6,345,765 B1 * 2/2002 Wiklof ..................... 235/472.01
2003/0019934 A1 * 1/2003 Hunter et al. ............. 235/462.2
2003/0029917 A1 * 2/2003 Hennick et al. ............ 235/454
2003/0062413 A1 * 4/2003 Gardiner et al. ............ 235/454
2003/0089776 A1 * 5/2003 Hennick et al. ............ 235/454
2003/0127520 A1 * 7/2003 Aizawa et al. ......... 235/472.03

* cited by examiner

Primary Examiner—Thien M. Le
(74) Attorney, Agent, or Firm—Oblon, Spivak, McClelland, Maier & Neustadt, P.C.

(57) ABSTRACT

An optical data code reader employing a scanner of simplified compact construction, which is constituted by a light projection means including a light source and a converging lens and a reflected light sensor means including a reflected light capture lens and a photosensitive element. A laser diode serving as the light source and a photodiode serving as the photosensitive element are mounted side by side on a common substrate in the form of a single chip module. A converging ball lens of the light projection means and the capture lens of the reflected light sensor means are mounted on a common support member, which is connected to the substrate of the laser diode and photodiode in such a manner as to facilitate assembling of the respective components. The capture lens is arranged as a narrow band pass filter permitting passage of only light rays of wavelengths originating from the light source of the scanner.

13 Claims, 8 Drawing Sheets

SPECTRAL TRANSMISSION CHARACTERISTICS OF DICHROIC LAYERS

FIG. 8

SPECTRAL CHARACTERISTICS OF COLORED GLASS + DICHROIC LAYERS

OPTICAL DATA CODE READER

BACKGROUND OF THE INVENTION

1. Field of the Art

This invention relates to an optical data code reader which is particularly suitable for use in reading printed data code patterns, for example, for reading bar code labels or the like.

2. Prior Art

As for example of optical data reader for optically reading a printed data code pattern, for example, there have been widely in use the so-called bar code readers for scanning and reading encoded information on bar code labels. The bar code readers of this sort are generally constituted by a light projection means and a reflected light sensor means to read information which is printed on bar code labels in the form of a variable density pattern. The light projection means includes at least a light source and a converging lens to project and converge a light beam toward a bar code label. Further, the reflected light sensor means includes at least a capture lens and a photosensitive element. Reflected light rays from a bar code label are picked up by the capture lens and thereby projected on the photosensitive element to detect variations in density of the printed data code pattern as variations in received light intensity. Therefore, the photosensitive element functions as a photoelectric converter, and output signals of the photosensitive element are fed to a signal processor and processed by known signal processing operations to read and translate the data code pattern.

For reading a printed data code pattern which has a certain length like a bar code, it becomes necessary to scan the data code pattern. For this purpose, it has been the conventional practice to use a line sensor as a photosensitive device, in combination with a light source which is arranged to project light rays over the entire length of a printed data code pattern area by the use of light emitting elements which are arranged in a linear form or by projecting light rays through a slit of a predetermined length. In this connection, it has also been known in the art to employ a movable reflector mirror, for example, a polygon mirror or a galvanomirror for scanning a light beam which is projected from a light source.

Adoption of the above-mentioned arrangements however inevitably results in an optical data code reader which is objectionably large in size and weight. Therefore, compact and light-weight hand scanner type data code readers have been introduced and put into use to replace large and heavy apparatus. The hand scanner type data code readers are adapted to be manually moved along a surface of a printed data code pattern, for example, along a surface of a bar code label.

A hand scanner type optical data reader is disclosed, for example, in Laid-Open Japanese Patent Application H11-39425. This prior art data code reader has, within a pen type casing, a light projection means consisting of a light source and a projected light guide member, along with a reflected light sensor means consisting of a photosensitive element and a reflected light guide member. A ball lens is fitted in a distal end portion of the pen type casing. A light beam which is projected from the light source is converged toward the bar code label, and reflections of the projected light are picked up by the ball lens and shed on the photosensitive element through the reflected light guide member. Therefore, both of projected and reflected light rays are passed through the ball lens. In this instance, the reflected light guide member is constituted by fiber optics, and the light source is constituted by a plural number of light emitting elements which are arranged annularly around a bundle of fiber optics of the reflected light guide member. Further, the projection light guide member is constituted by a collimating lens and a converging lens which has a function of holding fiber optics. A mirror-finish lens tube is located between the converging lens and the ball lens.

The ball lens which is provided at the distal end of the pen type casing is dragged across a bar code label in contact with the surface of the bar code label or in a suitably spaced relation with the latter to scan the bar code, that is to say, to read the data code pattern. For this purpose, the light beam which is projected on the surface of the bar code label needs to be converged to a beam spot of a small diameter at a predetermined position on the bar code label surface. On the other hand, reflected light rays from the bar code label, the light signals indicative of variations in density of the data code pattern, should be securely captured into the optical fibers of the reflection light guide member and transferred to the photosensitive element without losses. Since both projected and reflected light rays are passed through the one and same ball lens, it becomes necessary to provide two separate light paths through the ball lens, i.e., a first light path provided through the center of the ball lens for passage of reflected light and a second annular light path provided around the first light path for passage of projected light. Accordingly, a light flux from the light source as well as a light flux coming out of the projected light guide member is in the form of an annular beam, which is fed to the ball lens as a forwardly converging light flux.

The projected light flux incident on the ball lens is converged to an extremely narrow solid beam pattern at a near point where a bar code label is located. In so doing, it is necessary to prevent the projection light from forming an annular or blurred beam spot on the bar code label surface. In this regard, the mirror-finish tube of the projected light guide member on the side of the light source functions to scatter those light components which would not contribute to converge appropriately on the bar code label.

In the case of the above-mentioned conventional pen type bar code reader in the shape of a hand-operated scanner, both of projected light rays toward a bar code label and reflected light rays from the bar code label are passed through the same ball lens despite extremely large light losses. Namely, in converging an annular light flux, which is projected toward the ball lens, into an extremely narrow solid beam pattern toward the surface of a bar code label, it is necessary to scatter away all of those light components which cannot be converged toward a predetermined position, at the cost of a large amount of light loss. Therefore, there has to be employed a high output type light source, in combination with a photosensitive element of a larger size. Besides, in order to project an annular light flux from a light source and to converge the light flux from the light source to one point, the projected light guide member needs to include a collimating lens and a converging lens between the light source and the ball lens and a space which is enshrouded in a tube, resulting in a projection system which is extremely complicate in construction and large in size to contain a long light path.

On the other hand, on the side of the light receiving system which is so located as to utilize a center portion of the ball lens, it is necessary to position the photosensitive element at least on the rear side of the collimating lens, more specifically, on the rear side of light emitting elements, and to provide a guide means to transfer signal light from a bar code label as far as the photosensitive element. This is the reason why fiber optics are used as a reflected light guide. In such a case, transfer losses are inevitable since the fiber optics have an intrinsic numerical aperture (NA). In addition, noise components are increased by scattered light occurring on the side of the light source as a result of reflections off the tube and ball lens and getting into the fiber optics by reflections. Therefore, in order to prevent these noise component from entering the fiber optics, attempts have been made to limit the maximum acceptance angle by providing a convex surface at a light receiving end of the fiber optics thereby to inhibit entrance of scattered light as much as possible. However, even in that case, a large amount of scattered light still tends to enter the fiber optics to lower the S/N ratio to a considerable degree.

Furthermore, the light projection side is so arranged as to focus a light flux from the light source to a near point to the ball lens. Therefore, even by a slight variation in distance between the ball lens and a bar code label, the beam spot of projected light on the bar code label is blurred or deformed into an annular pattern, failing to converge effectively to a predetermined point. Therefore, in reading a data code pattern of a bar code label by means of a non-contacting type bar code reader, it becomes necessary to control the distance between the bar code reader and the bar code label strictly to avoid reading failures and malfunctioning of the reader although it is extremely difficult to control the movements of the data code reader precisely in reading operations.

SUMMARY OF THE INVENTION

In view of the foregoing situations, it is an object of the present invention to provide a data code reader which is reduced in weight and capable of reading data code accurately and reliably from a data code label means even when light is projected from a light source toward a data label medium at a reduced volume.

In accordance with the present invention, for achieving the above-stated objective, there is provided an optical data code reader for reading a data code from a data code label means bearing a printed data code pattern in the form of variations in density, the data code reader comprising: a scanner to be dragged across the data code label means bearing at the time of reading the data code, the scanner being composed of a light projection means including a light source and a converging lens for projecting and converging a light beam toward the label means, and a reflected light sensor means including a capture lens and a photosensitive element for capturing reflected light rays from the data code label means and converting an amount of captured reflection light into an electric signal; the light source being a monochrome light source having a single linear spectrum or a light source of a narrow radiation spectrum range; and the capture lens being constituted by a ball lens and arranged to have a narrow transmission wavelength band permitting passage of a light flux of a source wavelength radiated from said light source while cutting out other wavelengths.

A typical example of the label media to be read by the optical data code reader according to the present invention is the so-called bar code label. However, data can be indicated in a form other than bar codes, for example, by way of a pattern which is printed on paper or on a sheet-like material by the use of characters, figures, designed shapes or the like and which can be optically detected as variations in density. The scanner is manually dragged across the surface of the label means, detecting variations in intensity of reflected light from the label means to read the indicated data code.

In optically reading a data code on a label means, it is preferable to project a beam of monochrome light or of a single linear spectrum toward a label medium, converging the beam to a fine beam spot diameter. The projected light is reflected off the surface of the label means, and the intensity of reflected light varies according to the data code pattern on the label medium. The variations in reflected light intensity are taken into a reflected light sensor means as light signals. At this time, namely, at the time of detecting reflected light, light rays of wavelengths which have not originated from the light source are cut out to enhance the sensitivity and S/N ratio of the reflected light sensor means.

For this purpose, a light beam of a narrow wavelength band width, preferably, of a single linear spectrum is projected from the light source of the scanner. The light source is preferably a monochrome light source, for example, like a laser light source, which include for example a gas laser, a solid laser and a semiconductor laser. In this regard, from the standpoint of making the light source of the scanner compact, it is desirable to employ a semiconductor. Alternatively, among other light sources, it is possible to choose a light source which has a narrow radiation light spectrum range like a light emitting diode.

The light beam which is projected from the light source is converged toward the surface of the label medium by a converging lens which is located in front of and at a predetermined distance from the light source. The converging lens is of a high magnification power having a short back focal length and a longer front focal length. A ball lens is employed as the converging lens because a high magnification power can be obtained from a lens of small size. A ball lens of an extremely small diameter can be produced easily by a polishing operation. It follows that the light projection means including a light source and a converging lens can be constructed in a small and compact form, thanks to the reduction of the distance between light source and the converging lens. Since the converging lens has a long front focal length, the projected light beam can be converged effectively even if the distance between the converging lens and the label means is varied to some extent during a scanning operation. This contributes to make the reading operations or the scanning operations easier. However, in case a ball lens is used as a converging lens, there arises a problem of aberrations, especially spherical aberrations, resulting in blurring of a beam spot at a converging point. In order to suppress spherical aberrations, an aperture is provided on the front side of the ball lens. The aperture size should be large enough for preventing light losses which might result from errors in an assembling stage.

The capture lens of the reflected light sensor means is imparted with a wavelength selectivity in order to separate natural light from signals of reflected light to be shed on the photosensitive element as signals of variations in intensity of reflected light from the label medium. In this regard, if the transmitting wavelength of the capture lens is restricted to exactly correspond to the wavelength of the light beam which is projected on the label medium from the light source, the amount of light which is received by the photosensitive element can be reduced to a considerable degree due to transition of wavelength occurring to light rays which are angularly incident on the capture lens. Therefore, even in a case where the scanner employs a monochrome light source, it is desirable to arrange the capture lens in such a way as to have a selective wavelength band of a certain width including the source wavelength and transition wavelengths, while cutting out wavelengths on the shorter and longer sides of the selective wavelength band. For this purpose, the capture lens is arranged into a narrow wavelength band type with the so-called band pass filter to permit passage only of particular light rays in a narrow wavelength band, providing a reflected light sensor means of simple and compact construction which is virtually constituted by a capture lens and a photosensitive element. Therefore, the data code reader as a whole can be constructed in a small and compact form.

In this connection, in order to let the capture lens function as an optical filter, dichroic layers may be formed on one glass surface by laminating a large number of layers of dielectric material. Tens of dichroic layers are formed on one lens surface by alternately laminating a high refraction film layer H and a low refraction film layer L by a vacuum evaporation process to impart desired spectral transmission characteristics to the capture lens. The dichroic layers can be arranged to have also a function as a band pass filter which permits passage only of light components in a particular wavelength band. However, it becomes necessary to laminate an extremely large number of dichroic layers in order to let them function as a band pass filter. In this regard, the capture lens can be formed of colored glass to absorb or scatter light rays on the longer or shorter side of a selective wavelength band. In this case, the dichroic layers are formed on one side of the colored capture lens thereby to reflect light rays on the other side of the selective wavelength band. As a result, there is obtained a capture lens with a narrow selective transmission band in wavelength, absorbing or scattering light rays of wavelengths on the shorter side of the selective transmission band while reflecting light rays of wavelengths on the loner side of the selective transmission band by the dichroic layers.

As described above, the data code reader of the present invention, which is at least constituted by the light source, converging lens, capture lens and photosensitive element, is simplified in construction and improved to facilitate assembling of its respective parts, particularly precluding the adverse effects of assembling or machining errors as much as possible. Firstly, regarding the ball lens which is employed as a converging lens of the light projection means, what is required in assembling the ball lens is simply to locate the center of the ball lens on an extension line which is drawn from the center of a light emitting point of the light source. There is no need for adjusting inclinations of the optical axis of the converging lens. On the other hand, namely, on the side of the reflected light sensor means, the positions of the capture lens and the photosensitive element can be adjusted in a facilitated manner since there is no need for providing a optical filter for narrowing the transmission wavelength band.

In order to construct the data code reader in a more compact form and at the same time to facilitate the assembling work, the scanner employs a semiconductor laser as a light source of the light projection means, and a photodiode as a photosensitive element of the reflected light sensor means. In this regard, it is desirable to mount the semiconductor laser and the photodiode on a common substrate. Since the light source can be a low output type as mentioned hereinbefore, it is possible for the scanner to employ a small-size semiconductor laser as its light source, which can be provided on a single chip along with a photosensitive element. Further, according to the present invention, the converging lens and the capture lens are mounted on a common support member, which is in turn connected to the above-mentioned common substrate of the semiconductor laser and the photosensitive element to facilitate the assembling of the respective components. More specifically, the converging lens and the capture lens are mounted on a single holder member, which is connected to the substrate. Formed in the holder member is first and second openings for fitting therein the converging lens and the capture lens, respectively. With these arrangements, the converging lens can be set in position simply by abutting same against edge portions around the first opening of the holder member, which also functions as an aperture for the converging lens.

As described above, according to the present invention, the light source and the photosensitive element are integrated into a single chip module by the use of a common substrate, while the converging lens and the capture lens are mounted on a single common holder member. In this case, it is desirable to arrange the optical axes of the light projection means and the reflected light sensor means substantially parallel with each other, and to provide a reflector mirror forward of the converging lens of the light projection means thereby to bend the light path of a projected light beam through a predetermined angle toward the optical axis of the reflected light sensor means. Therefore, reflected light rays off the surface of a label medium are directed angularly toward the capture lens at the same angle as the bending angle of the reflector mirror. In this case, it is possible either to provide a counter reflector mirror on the opposite side, or to let the reflected light rays angularly fall on the capture lens. In this regard, the bending reflector mirror can be omitted in a case where the respective components of the light projection means and reflected light sensor means are set on optical axis which are angularly tilted toward each other in the forward direction.

The output light rays projected from the laser light source have substantially a single linear spectrum. However, depending on the angle of incidence on the capture lens, a shift or transition of wavelength occurs to the light rays. Accordingly, especially in a case where reflected light rays are directed angularly toward the capture lens, it is necessary for the capture lens to have spectral transmission characteristics which permit passage of light rays with a transition wavelength, which occurs to light rays which are incident at an angle smaller than 35 degrees, while cutting out other wavelengths to capture and transfer only reflections of the projected light to the photosensitive element in a secure and reliable manner.

In order to capture reflected light rays from the label medium more effectively, it is desirable to arrange the capture lens into an aspheric form. In this instance, a capture lens of an aspheric shape can be formed, for example, by the use of a lens molding means. Alternatively, the capture lens can be made aspheric by laminating a replica on one surface of a spherical lens. Namely, the capture lens, which is a spherical lens by itself, is made aspheric by laminating a replica on one of its lens surfaces. In a case where dichroic layers are provided on one surface of the capture lens, a replica is provided on the other lens surface. The capture lens is constituted by a planoconvex lens or by a convex lens having spherical surfaces akin to a planoconvex shape, and desirably the dichroic layers are formed on the plane side or almost plane curved surface of the lens and a replica is formed on the other side of the lens to ensure uniformity of the dichroic layers. As for a more specific example of the replica construction, there may be employed a replica of an aspheric shape which is constituted by three concentric zones having curved surfaces of different curvatures, including a center zone occupying a center portion of an effective surface area of the capture lens including an optical axis of the latter and having a curved surface of a smaller radius of curvature than the capture lens surface, an outer zone forming an outer rim of the replica along the outer periphery of the effective surface area of the capture lens and having a curved surface of a larger radius of curvature than the center zone, and an intermediate zone provided between the center and outer zones and having a curved surface of a radius of curvature larger than the outer zone.

The above and other objects, features and advantages of the present invention will become apparent from the following particular description, taken in conjunction with the accompanying drawings which show by way of example preferred embodiments of the invention.

DESCRIPTION OF PREFERRED EMBODIMENTS

Figure 1:
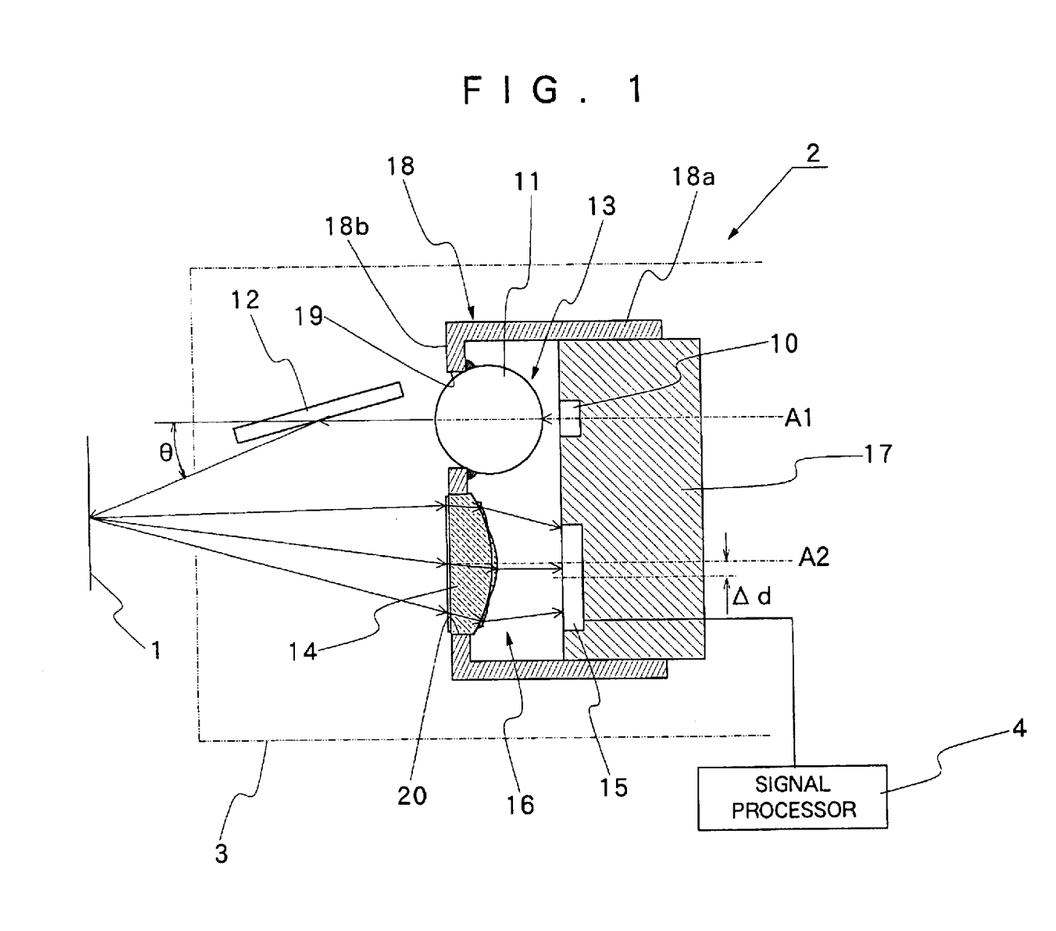
FIG. 1 is a schematic illustration of a bar code reader, as an example of application of the optical data pattern reader according to the present invention.

Hereafter, the present invention is described more particularly by way of its preferred embodiments with reference to the accompanying drawings. Referring first to FIG. 1, there is schematically shown a data code reader according to the present invention. In the following description of preferred embodiments, by way of example the data code reader according to the invention is applied as a bar code reader 2 which is adapted to read a printed data code pattern on a bar code label 1, and the bar code reader 2 is largely constituted by a scanner 3 and a signal processor 4. In this connection, the scanner 3 and the signal processor 4 may be provided as separate components. However, if desired, the scanner 3 and signal processor 4 may be built into one and same casing. A known circuitry can be employed for the signal processor 4, and therefore particulars of the signal processor 4 are omitted here.

The scanner 3 is largely constituted by a light projection means 13 including a laser diode 10 serving as a light source, a ball lens 11 serving as a converging lens and a reflector mirror 12 for bending a light path, and a reflection light sensor means 16 including a reflected light capture lens 14 for passing light rays in a narrow wavelength band and a photodiode 15 serving as a photosensitive element. The laser diode 10 is of a linear spectrum type having emission of 650 nm. The laser diode 10 and the photodiode 15 are mounted side by side on the same substrate 17 to provide the so-called one-chip construction. Besides, the ball lens 11 and the capture lens 14 are mounted on a holder member 18 which is connected to the substrate 17.

The holder member 18 is constituted by an axial fitting portion 18a, which is fitted on or around the substrate 17, and a holder frame portion 18b having circular openings for fitting the ball lens 11 and the capture lens 14. In addition to the connection to the substrate 17, the axial fitting portion 18a of the holder member 18 has a function of adjusting the distance between the laser diode 10 on the substrate 17 and the ball lens 11 and the distance between the capture lens 14 and the photodiode 10 on the substrate 17. The holder frame portion 18B of the holder member 18 is located forward of the laser diode 10 and photodiode on the substrate 17, and provided with first and second openings 19 and 20 of predetermined diameters for fitting the ball lens 11 and the reflection capture lens 14 in alignment with optical axes of the laser diode 10 and the photodiode 15, respectively.

The ball lens 11 is fitted in the first opening 19 for converging a projected light beam. The capture lens 14 which is fitted in the second opening 20 is approximately a planoconvex lens or a biconvex lens one surface of which is almost flat in curvature. The capture lens 14 has its outer peripheral portions fitted in the second opening 20 of the holder frame portion 18b. On the other hand, in the case of the ball lens 11, the body of the ball lens 11 itself is fitted in the first opening 19. In mounting the ball lens 11 on the holder 18, the center of the ball lens 11 should be located on an axial extension line of a light emitting point of the laser diode 10, and there is no need for adjusting an optical axis. That is to say, as long as the first opening 19 on the holder is in alignment with the laser diode 10, it suffices to fix the ball lens 11 in the first opening 19 of the holder member 18 by the use of an adhesive, and the ball lens 11 is set in position without any further adjustment. Since the open area of the first opening 19 is limited, it also functions as an aperture.

As described above, the laser diode 10 is mounted on the substrate 17 along with the photodiode 15 to provide a single chip emission-reception assembly. On the other hand, the ball lens 11 and the capture lens 14 are mounted on the holder member 18, which is connected and assembled with the substrate 17. Thus, optical axis A1 of the light projection system, which is constituted by the laser diode 10 and the ball lens 11, is disposed parallel with optical axis A2 of the capture lens 14. Therefore, a reflector mirror 12 is provided to turn the optical axis A1 on the side of the light projection system. The reflector mirror 12 can be fixed, for example, on the holder member 18 or on the casing of the scanner 3. Therefore, the light path of the projection light from the laser diode 10, coming along the optical axis A1, is turned by the reflector mirror 12 and projected on the bar code label 1 with an angle of incidence θ. Signal light reflected off the surface of the bar code label 1 is received by the capture lens 14, with an angle θ with respect to the optical axis A2 of the capture lens 14. In order to maximize the level of signal light to be received by the photodiode 15 past the capture lens 14, the photodiode 15 is located at a position which is deviated by Ad from the optical axis A2 of the capture lens 14.

With the arrangements just described, the bar code reader 2 can be reduced in weight and provided in a compact form, which can be assembled in a facilitated manner and fabricated at a reduced cost. Besides, it can read data on bar code labels 1 accurately, with high sensitivity and resolution and an extremely good S/N ratio which will make signal processing operations at the signal processor 4 easier.

Figure 2:
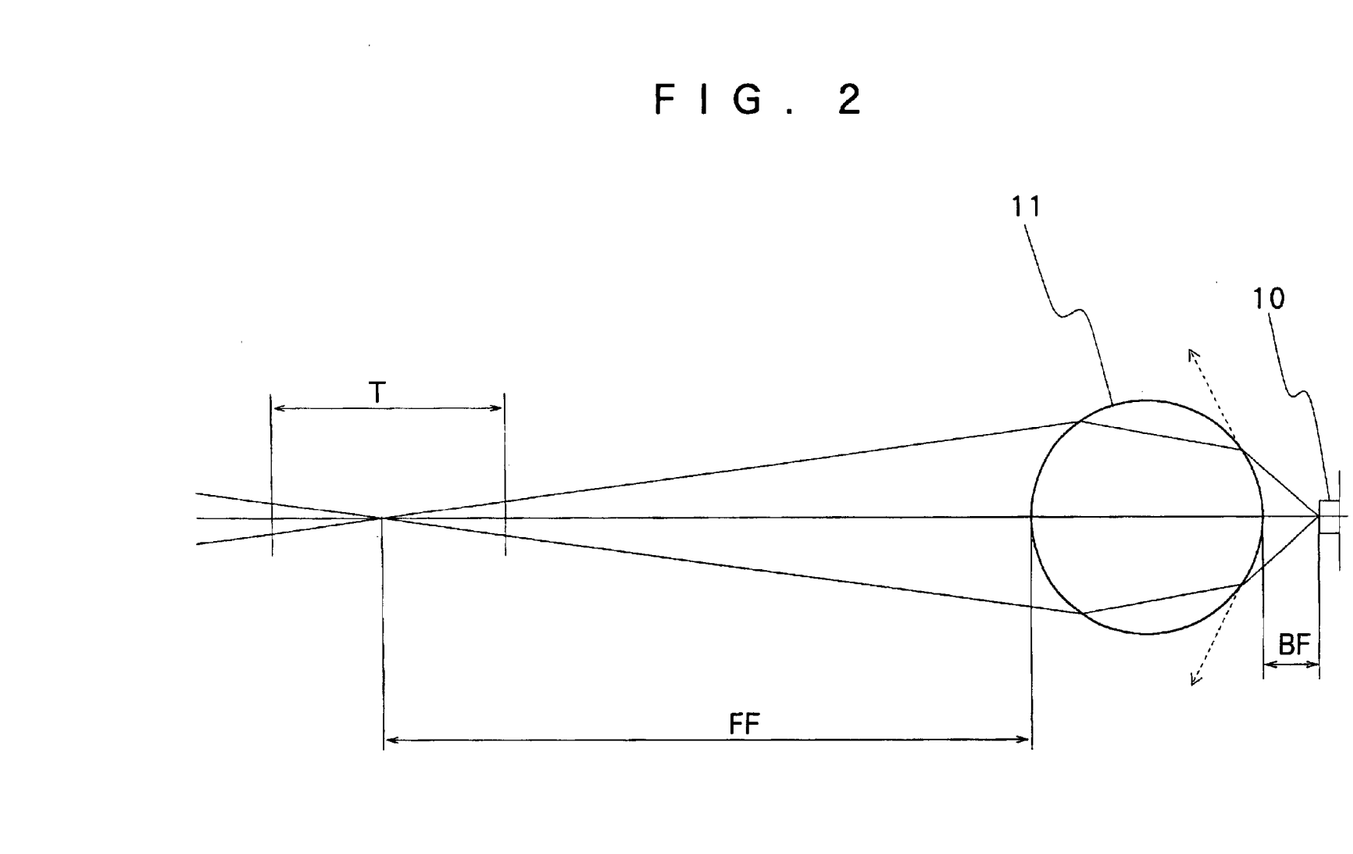
FIG. 2 is a schematic illustration of a light projection means employed in the bar code reader shown in FIG. 1.
Figure 3:
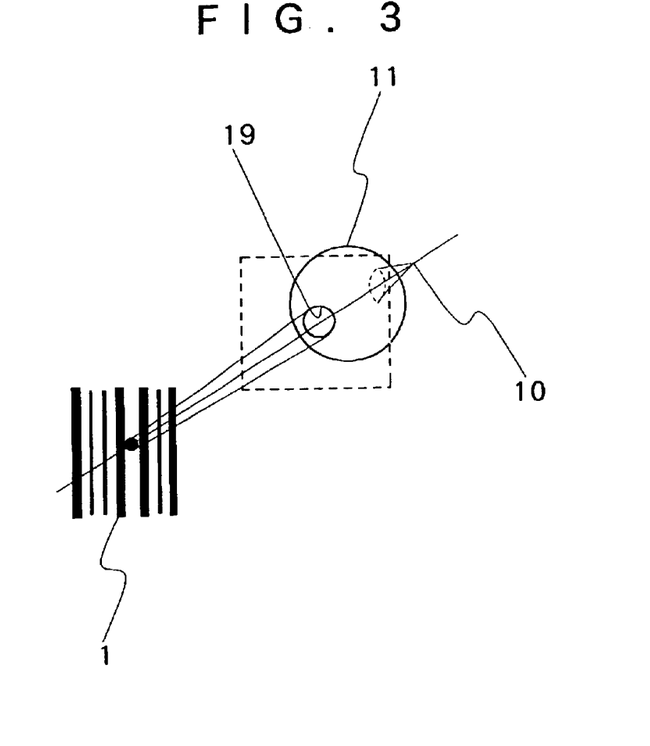
FIG. 3 is a schematic perspective view of the light projection means shown in FIG. 2.

Thus, the projected light from the laser diode 10 can be converged toward the bar code label 1 by the ball lens 11 as shown in FIGS. 2 and 3. In these figures, the reflector mirror 12 which is employed by the light projection means 13 for angularly turning the path of projection light is omitted for the sake of simplification of illustration.

As shown in FIG. 2, projection light which is emitted from the laser diode 10 is in the form of a laser beam, that is to say, a beam of scattered light. By passage through the ball lens 11, the projected light is converged toward the bar code label 1. The ball lens 11 is a thick lens having a high magnification power. In order to use an effective light flux fraction of scattered light, occurring at a point of emission of the laser diode 10, for projection through the ball lens 11 which is located at the distance BF from the laser diode 10, the projected light beam is converged to the smallest beam spot at the distance FF from the front surface of the ball lens 11. In a case where the diameter of the ball lens 11 is 2 mm, for example, a projection light beam is converged to the smallest beam spot diameter of 0.2 mm at the distance of 80 mm from the front surface of the ball lens 11 if the distance between the laser diode 10 and the ball lens 11 is approximately 0.5 mm. Thus, it becomes possible to shorten the length of the light path between them. Besides, there is a long feasible range T which extends forward and rearward of the smallest beam spot position and in which the projected light beam is converged sufficient enough for data code reading. In addition, since the marginal edges of the first opening 19 of the holder member 18, which are in abutting engagement with the front side of the ball lens 11, function as an aperture to correct aberrations such as spherical aberrations, preventing blurring of the beam pattern of projected light on the bar code label 1. Therefore, at the time of scanning the bar code label 1 with the scanner 3, the intervening distance between the scanner 3 and the bar code label 1 can be adjusted easily over a relatively broad range. That is to say, data codes can be read correctly and effectively even when the scanner 3 is located more or less distantly from the bar code label 1.

In the case of the particular embodiment shown, it is important for the light projection means 13 to have the laser diode 10, the ball lens 11 and the first opening or aberration correcting aperture 19 in alignment with each other. The laser diode 10 is mounted on the substrate 17 together with the photodiode 15, while the ball lens 11 is fitted in the first opening 19 of the holder member 18 side by side with the capture lens 14 which is fitted in the second opening 20. Therefore, as long as the position of the holder member 18 is adjusted relative to the substrate 17, the ball lens 11 can be automatically put in an aligned position simply by securely setting same in the first opening 19 of the holder member 18 by the use of an adhesive or the like. At the same time, the capture lens 14 and photodiode 15 are also automatically brought into a predetermined position relative to each other. Namely, upon connecting the holder member 18 in position relative to the substrate 17, the alignment of the respective components of the light projection means 13 as well as positioning of the components on the side of the reflected light sensor means 16 is completed automatically. This means that the scanner 3 can be assembled in an extremely facilitated manner.

Figure 4:
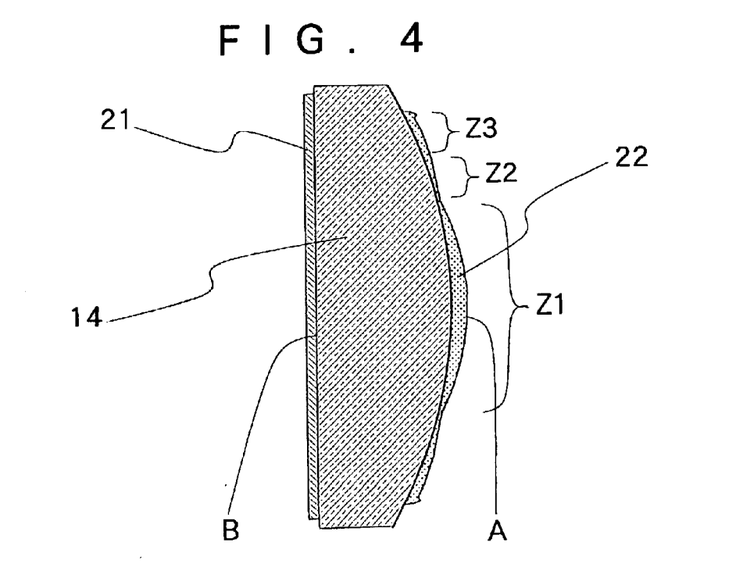
FIG. 4 is a schematic sectional view of a light capture lens.

As described above, the light beam which is projected by the light projection means 13 is converged on the bar code label 1, and reflected light off the bar code label 1 is captured by the reflected light sensor means 16. The reflected light sensor means 16 is arranged to capture only reflections of light originating from the laser diode 10, cutting out light of other wavelengths as noise components. For this purpose, the capture lens 14 is arranged as shown in FIG. 4 to pass selectively light of a particular wavelength band only. In other words, the capture lens 14 itself is arranged as a narrow wavelength band type capture lens which functions as a band pass filter.

Figure 5:
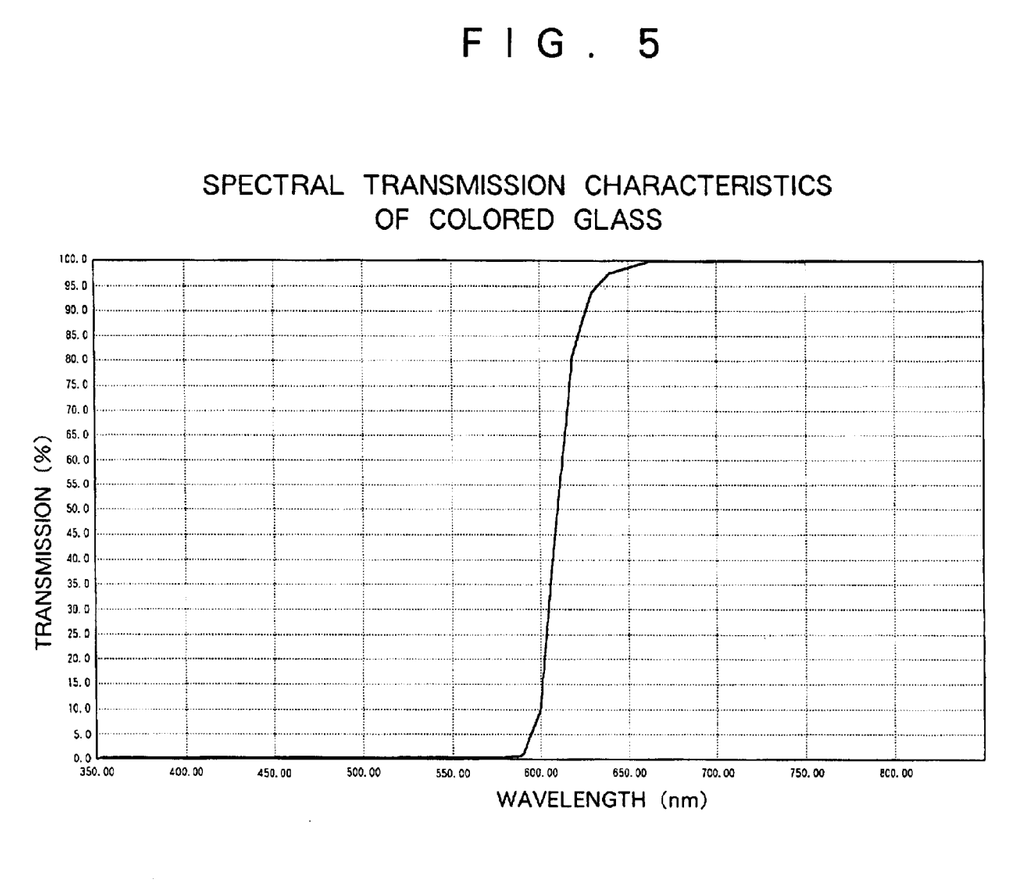
FIG. 5 is a spectral transmission characteristics diagram of colored glass for the light capture lens shown in FIG. 4.
Figure 6:
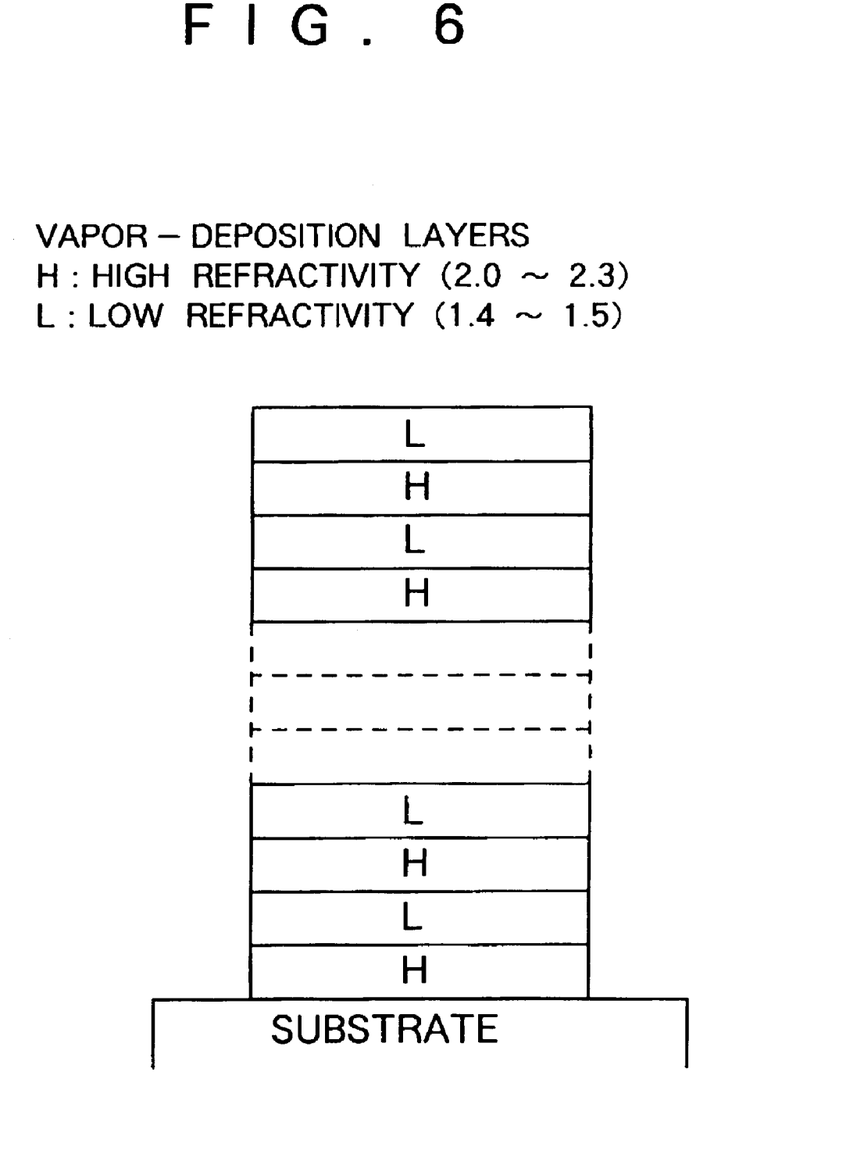
FIG. 6 is a schematic illustration showing a concept of dichroic film layers to be formed on the light capture lens of FIG. 4.
Figure 7:
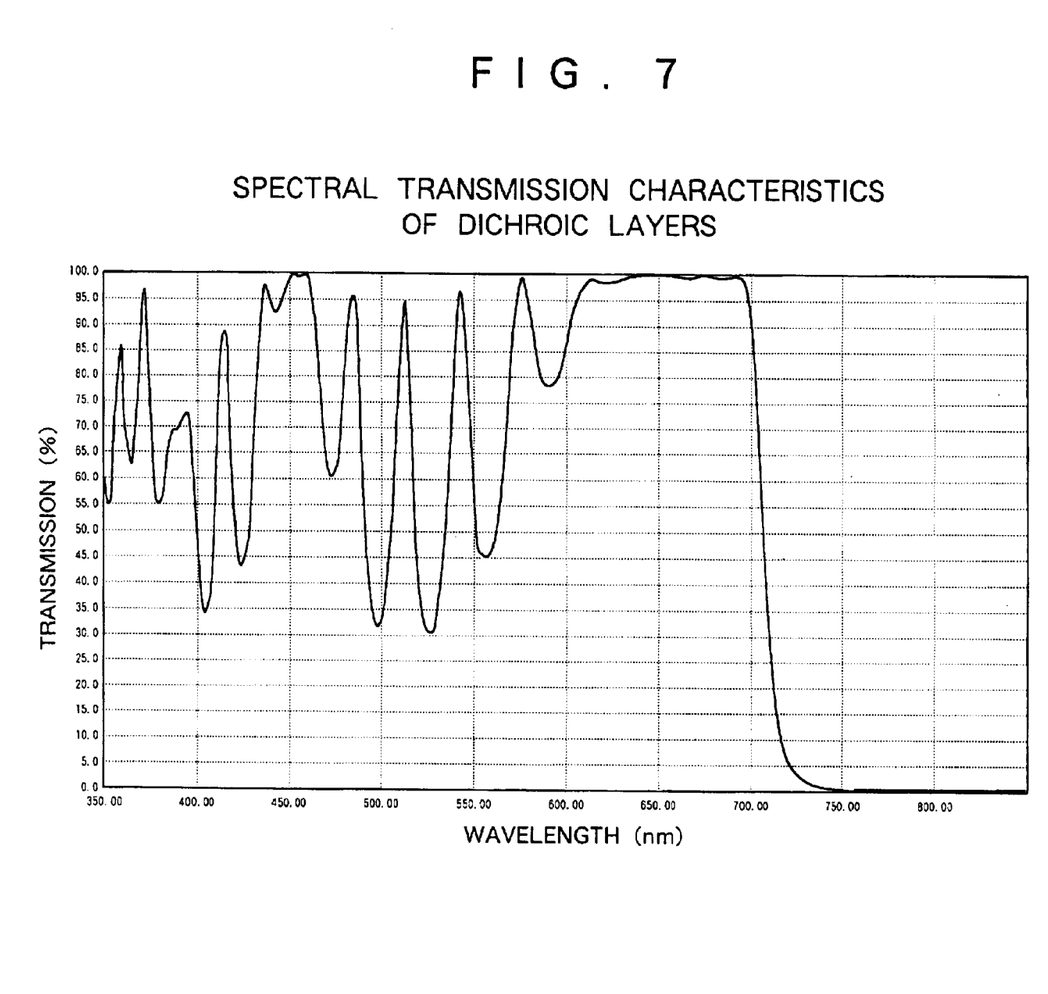
FIG. 7 is a spectral transmission characteristics diagram of the dichroic film layers shown in FIG. 6.

The capture lens 14 itself is constituted by a convex glass lens having a spherical surface of a small radius of curvature, that is to say, a convex surface of a large curvature on the rear or inner side A, and having a substantially flat surface or an almost flat spherical surface on the front or outer side B. The capture lens 14 of a narrow wavelength band, in the form of a convex lens, is formed by polishing colored glass. The reason for the use of colored glass is to impart functions as a filter to the capture lens 13. In this instance, a capture lens with spectral transmission characteristics as shown in FIG. 5 can be obtained by the use of colored glass, for example, by the use of colored glass which is available from Scott Corporation under the product name of RG610 or RG630 or colored glass which is available from Hoya Co., Ltd. under the product name of R60. Formed on the outer lens surface B of the capture lens 14 are dichroic layers 21, which is constituted by 20 alternately laminated layers of high refraction films H (index of refraction=2.0 to 2.3) and low refraction films L (index of refraction=1.4 to 1.5), for example, by vacuum evaporation. These dichroic layers 21 have spectral transmission characteristics as shown in FIG. 7.

Figure 8:
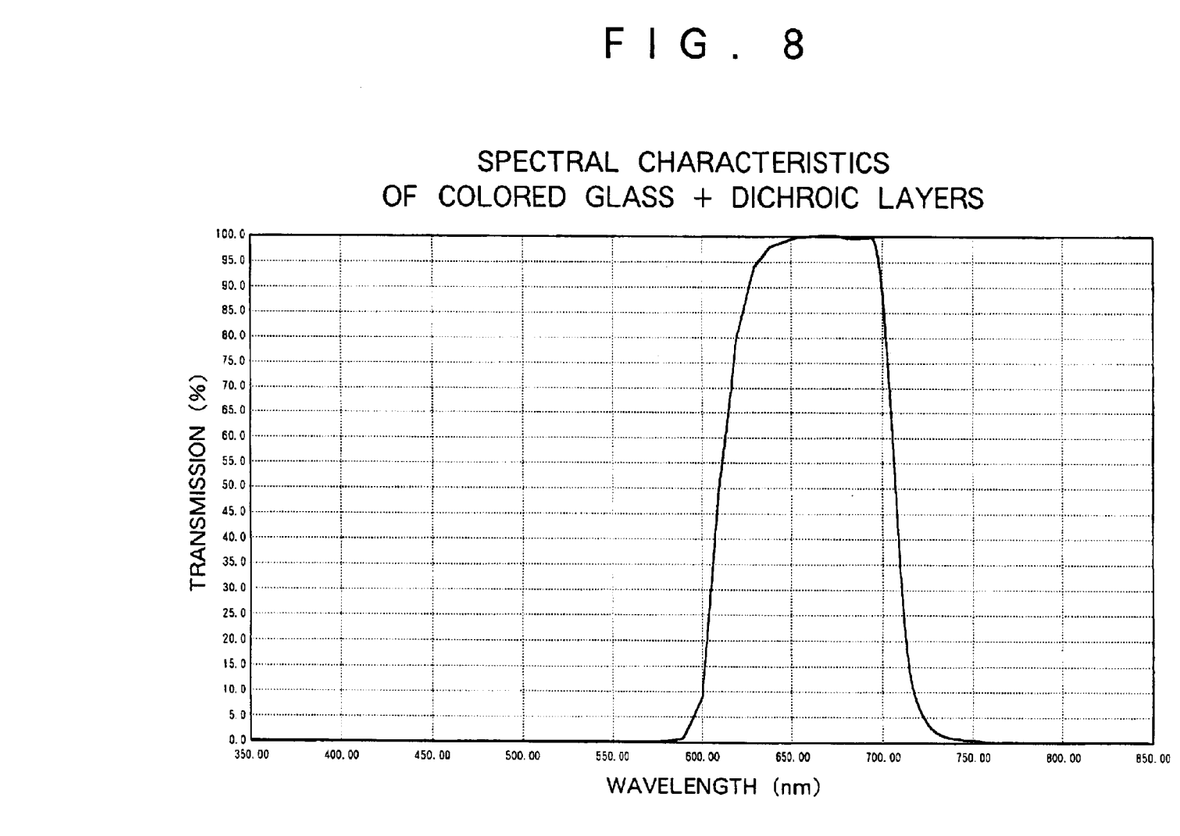
FIG. 8 is a spectral transmission characteristics diagram of the light capture lens shown in FIG. 4.

The capture lens 14 as a whole has spectral transmission characteristics as shown in FIG. 8. More particularly, light components of wavelengths smaller than 600 nm as well as light components of wavelengths larger than 750 nm are cut out almost 100%, while only light components of wavelengths between 600 nm and 750 nm are passed through. As a consequence, a light flux of 650 nm, which is the output wavelength of the laser diode 10, is passed through the capture lens substantially 100%.

In this connection, as shown in FIG. 1, the light beam incident on the bar code label 1 is bent by the angle θ by the action of the reflector mirror 12. Therefore, a chief ray of reflected light off the bar code label 1 is directed toward the capture lens 14 at the angle θ. In case a light path to the capture lens 14 is arranged angularly like this, transition of wavelength occurs to the incident reflected light rays, from the radiating wavelength of the laser diode 10. Therefore, the capture lens 14 is arranged to have a selective wavelength band of a certain breadth. More specifically, the capture lens 14 is arranged to have the spectral transmission characteristics as shown in FIG. 8 for passing transition wavelengths which occur when the angle of incidence θ on the capture lens 14 is 35 degrees. The narrower the width of the wavelength band of the capture lens 14, the greater become the losses in capturing reflected light. On the other hand, the broader the width of the wavelength band, the greater becomes a noise component.

By limiting the transmission wavelength band width of the capture lens 14 in this manner in relation with output wavelength of the laser diode 10 which produces a beam of a single wavelength, it becomes possible to receive only reflections of light originating from the laser diode 10, almost completely cutting out noise components coming from natural light or other external noise components. This makes it possible to improve the sensitivity of the photodiode and S/N ratio to a marked degree. Accordingly, even in a case where the laser diode 10 of low power type which is low in output light intensity, the sensitivity of the photodiode 15 can be enhanced to a sufficient degree.

Further, the capture lens 14 is arranged as an aspheric lens for the purpose of minimizing the light receiving area of the photodiode 15 as a photosensitive element and for increasing the amount of light to be received by the photodiode 15. However, the capture lens 14 which is a spherical lens by itself is arranged into an aspheric lens by forming a replica 22 on the side of the lens surface A. In this instance, the replica 22 functions to enhance the efficiency of convergence rather than correcting aberrations.

For this purpose, as shown in FIG. 4, the replica 22 is composed of a center zone Z1 having a curved surface formed around the optical axis in a larger curvature than the capture lens 14, an intermediate zone Z2 having a curved surface of a predetermined width and of the smallest curvature formed concentrically between the center zone Z1 and an outer zone Z3 having a curved surface of a predetermined width and of a larger curvature and located in the outermost position in such a way as to rim an outer peripheral side of an effective area. Instead of providing the three concentric curved surfaces which are varied stepwise in curvature, an aspheric surface of a different shape may be provided according to a particular shape of a light receiving surface of the photodiode 15. Alternatively, if desired, the curvature may be varied in each one of the zones Z1 to Z3. From the standpoint of efficient convergence, variations of a higher order may be provided on the surface of the replica.

Figure 9:
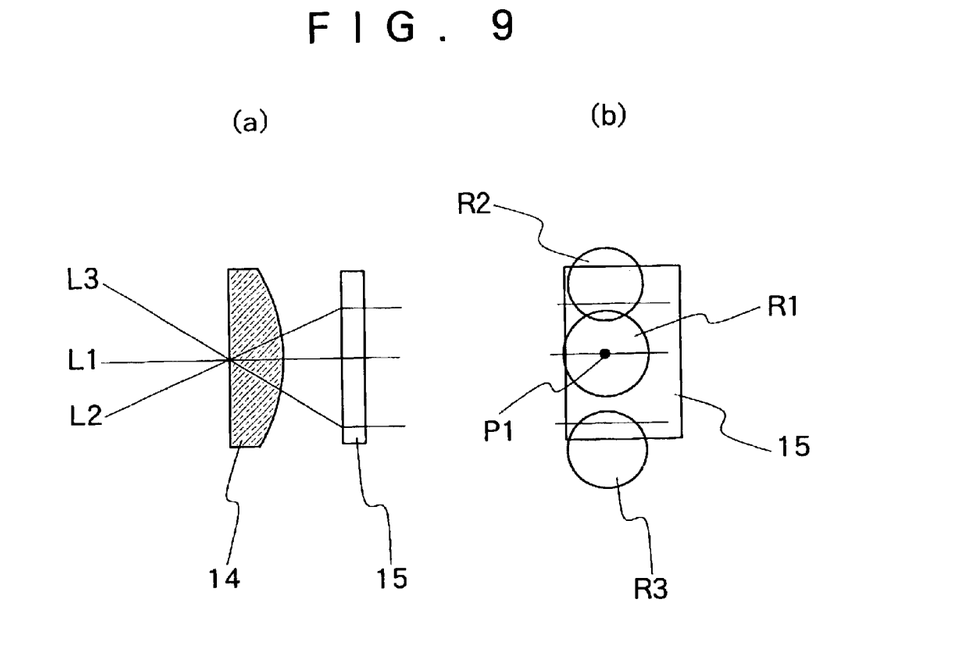
FIG. 9 is a schematic illustration explanatory of the volume of light received by a photosensitive element through a spheric capture lens without a replica.
Figure 10:
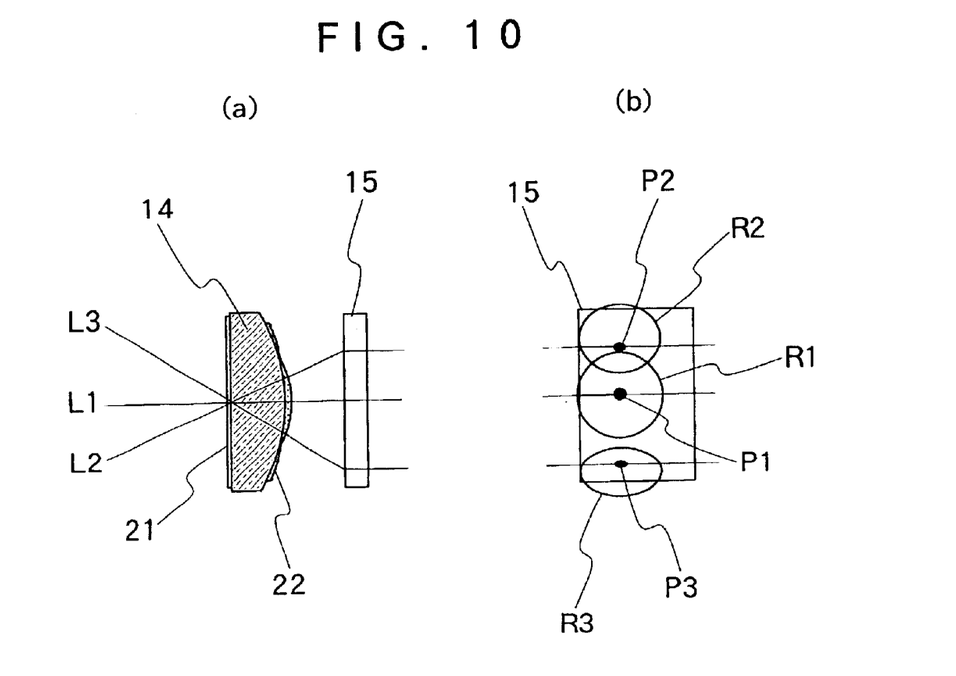
FIG. 10 is a schematic illustration explanatory of the volume of light received by a photosensitive element through an aspheric capture lens with a replica.

The efficiency of convergence toward a narrow light receiving area of the photodiode can be enhanced by providing on the capture lens 14 the replica 22 of the above-described construction. Shown comparatively in FIGS. 9 and 10 are amounts of light received by the photodiode 15, in one case through the capture lens 14 which is in the form of a spherical lens without any replica and in the other case through the capture lens 14 which is in the form of an aspheric lens having the replica 22 provided on the inner lens surface A. Indicated at (a) in these figures are incident light rays, and at L1, L2 and L3 are chief rays of the incident light rays, the light ray L1 being at the angle of zero degrees with the optical axis of the capture lens 14, the light ray L2 being at the angle of 24 degrees and the light ray L3 being at the angle of 32 degrees. Further, schematically show at (b) in these figures are received light spot patterns R1, R2 and R3 of the incident light rays L1, L2 and L3 on a light receiving surface of the photodiode 15.

Upon comparing the two cases, it has been revealed that a point of convergence P1 is observed in a received light pattern R1 of the chief ray L1 at the angle of zero degree, but no point of convergence is observed in received light patterns R2 and R3 of the chief rays L2 and L3 at the angles of 24 and 32 degrees, respectively. Namely, in the case of the chief rays L2 and L3, the received light pattern R2 or R3 on the light receiving surface area of the photodiode is out of focus and blurred. In addition, the received light patterns R2 and R3 are partially deviated from the light receiving surface area. Especially in the case of the chief ray of 32 degrees, a major part of the received light pattern R3 is located outside the light receiving area of the photodiode. In contrast, in the case of the aspheric capture lens 14 with the replica 22, as indicated at P1, P2 and P3, a point of convergence is observed not only in a received light pattern R1 of the chief ray L1 of zero degrees but also in received light patterns R2 and R3 of the chief rays L2 and L3 of 24 and 32 degrees, respectively. Besides, regarding the received light patterns R2 and R3, each pattern is shifted toward the center of the light receiving area, and a major part of the pattern falls within the boundaries of the light receiving area. Thus, a greater amount of light can be received from the laser diode 10 by arranging the capture lens 14 into an aspheric form by the use of the replica 22. In a case where it suffices to receive reflected light in an amount which would be transmitted by the capture lens 14 without the aspheric arrangements, one can employ a small and compact photodiode 15 with a smaller light receiving surface area. In this case, in addition to compactness, it becomes possible to improve the S/N ratio in a degree corresponding to a reduction of the light receiving surface area of the photodiode.

As described above, according to the present invention makes it possible to construct the scanner 3 in a compact form, which is considerably reduced in size and weight. In addition, the data code reader with the scanner 3 is easier to assemble and can be fabricated at a lower cost as compared with conventional counterparts. Accordingly, the data code reader according to the present invention can be easily and widely built into various electric or electronic instruments, for example, into a remote controller of a TV set. Further, the scanner can employ a low output type laser diode 10 as a light source to reduce its power consumption. More importantly, when the scanner is applied as a bar code reader to scan a bar code label 1, it can read data from the bar code label with far less possibilities of reading errors or failures, and therefore it can be operated easily and in a reliable manner.

Thus, as clear from the foregoing particular description, the data code reader of the present invention is light, simple and compact in construction, and can read data code patterns with extremely high accuracy, thanks to conspicuous enhancement in sensitivity of the photosensitive element and drastic improvement of S/N ratio.

What is claimed is:

1. An optical data code reader for reading a data code from a data code label means bearing a printed data code pattern in the form of variations in density, said data code reader comprising:

a scanner to be dragged across the data code label means bearing at the time of reading said data code, said scanner being composed of a light projection means including a light source and a conversion lens for projecting and converging a light beam toward said label means, and a reflected light sensor means including a capture lens and a photosensitive element for capturing reflected light rays from said data code label means and converting an amount of captured reflection light into an electric signal;

said light source being a monochrome light source having a single linear spectrum or a light source of a narrow radiation spectrum range; and said capture lens being constituted by a ball lens and arranged to have a narrow transmission wavelength band permitting passage of a light flux of a source wavelength radiated from said light source while cutting out other wavelengths.

2. An optical data code reader as defined in claim 1, wherein said light source is constituted by a semiconductor laser, and said photosensitive element is a photodiode, said semiconductor laser and photodiode being provided on a common substrate.

3. An optical data code reader as defined in claim 2, wherein said converging lens and said capture lens are mounted on a common support member, which is connected to said substrate of said semiconductor laser and photodiode.

4. An optical data code reader as defined in claim 3, wherein said capture lens is formed of colored glass for absorbing or scattering light rays of wavelengths on the longer or shorter side of said transmission wavelength band, and provided with dichroic layers on one lens surface thereof to reflect light rays of wavelengths on the shorter or longer side of said transmission wavelength band.

5. An optical data code reader as defined in claim 4, wherein said colored glass has properties of absorbing or scattering wavelengths on the shorter side of said transmission wavelength band, and said dichroic layers are adapted to reflect light rays of wavelengths on the longer side of said transmission wavelength band.

6. An optical data code reader as defined in claim 3, wherein said holder member is provided with first and second openings for fitting therein said converging lens and said capture lens, respectively, said converging lens being abutted against edges around said first opening to utilize the latter as an aperture.

7. An optical data code reader as defined in claim 6, wherein optical axes of said light projection means and said reflected light sensor means are disposed substantially parallel with each other, and a reflector mirror is provided forward of and in a light path of a projected light beam from said aperture to bend said light path through a predetermined angle.

8. An optical data code reader as defined in claim 7, wherein said capture lens is arranged to have such spectral transmission characteristics as to pass light rays in a transition wavelength range or light rays incident at an angle smaller than 35 degrees and having a transition wavelength from said source wavelength, while cutting off light rays of other wavelength.

9. An optical data code reader as defined in any one of claims 1 to 8, wherein said capture lens is arranged as an aspheric lens.

10. An optical data code reader as defined in claim 9, wherein said capture lens is constituted by a spherical lens and a replica laminated on one surface of said spherical lens to arrange the latter into an aspheric form.

11. An optical data code reader as defined in claim 10, wherein said capture lens is provided with said replica on a lens surface on the opposite side of said lens surface with said dichroic layers.

12. An optical data code reader as defined in claim 11, wherein said capture lens is constituted by a planoconvex lens or by a convex lens having lens surfaces of almost a planoconvex shape, said dichroic layers being formed on a plane lens surface or an almost flat convex lens surface of said capture lens, and said replica being formed on the other lens surface on the opposite side of said capture lens.

13. An optical data code reader as defined in claim 10, wherein said replica is constituted by at least three concentric zones of different curvatures, including a center zone occupying a center zone of an effective lens area including and around an optical axis and having a curved surface of a smaller radius of curvature than said capture, an outer zone formed annularly along an outer periphery of said effective lens area and having a larger radius of curvature than said center zone, and an intermediate zone provided between said center zone and said outer zone and having a larger radius of curvature than said outer zone.

* * * * *